UNITED STATES PATENT OFFICE.

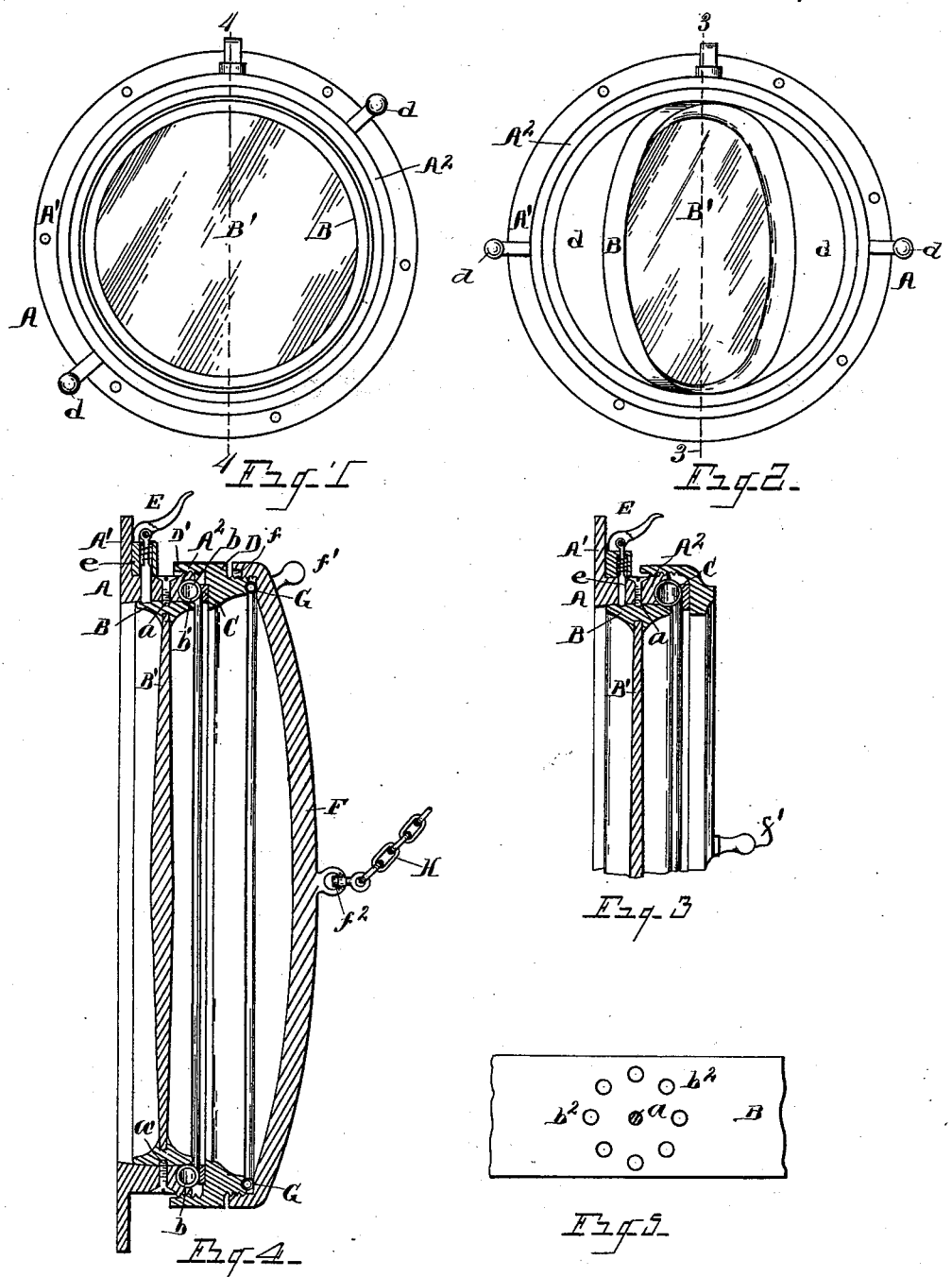

CHARLES ANDERSON, OF DETROIT, MICHIGAN.

SIDE LIGHT.

SPECIFICATION forming part of Letters Patent No. 521,777, dated June 26, 1894.

Application filed December 14, 1893. Serial No. 493,710. (No model.)

*To all whom it may concern:*

Be it known that I, CHARLES ANDERSON, a citizen of the United States, residing at Detroit, county of Wayne, State of Michigan, have invented a certain new and useful Improvement in Side Lights; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in a side light or scuttle for a ship's side, and it consists of the devices and appliances, their construction, combination and arrangement, as hereinafter specified and claimed and illustrated in the accompanying drawings, in which—

Figure 1 is a view in elevation, showing the pivoted light, or scuttle closed. Fig. 2 is a similar view of the device showing the pivoted light open. Fig. 3 is a partial vertical section on the line 3—3 Fig. 2. Fig. 4 is a vertical section on the line 4—4 Fig. 1, showing also a "dead door" engaged with the side light. Fig. 5 is a detail view in plan of a portion of the rim of the light, adjacent to the upper pivotal connection, with suitable perforations to engage the latch.

The desirability and utility of a device of this class is well understood by vessel men.

The purpose of my invention is to provide such a side light or scuttle of superior simplicity, economy and utility one which may be more readily and easily operated, and one wherein the pivoted light may be effectually and firmly held in any desired position.

I carry out my invention as follows: A represents a suitable supporting frame or ring constructed with a flange or shoulder A' by means of which the device is engaged and held in place in the ship's side. The frame or case is also constructed with a flange $A^2$ within which is pivotally engaged the rim B provided with the light of glass B' suitably secured therein. Engaged in the flange $A^2$ of the case are pivots "$a$" and $a'$ upon which the rim B is pivoted so as to swing about, as shown in Fig. 2. To make the rim B and the flange $A^2$ water tight when the light is closed, I locate in a suitable recess "$b$" of said flange, a suitable ring, preferably a ring of rubber tubing $b'$. The recess "$b$" is in the inner edge of the flange $A^2$. Over the packing ring is located a movable ring C. Over this ring C and over the outer edge of the flange $A^2$ is located a rotatable compression ring D constructed with an inwardly projecting flange D' having a screw threaded engagement upon the exterior of the flange $A^2$, as shown. This compression ring is preferably provided with operating handles "$d$" engaged therewith in any suitable manner, the construction being such that the compression ring may be screwed up upon the flange $A^2$ forcing the ring C upon the packing ring $b'$, and thereby compressing the packing ring and forcing it firmly down into contact with the rim B thereby making the rim B and the flange $A^2$ thoroughly water tight when the light is closed.

When it is desired to open the light, the compression ring D is unscrewed so that the rim B can be readily swung about, as illustrated in Fig. 2, upon its pivotal connection. This method is readily operative and is every way most efficient.

To hold the light in any desired position when open, so that it may be held at any desired angle to the plane of the ship's side, I provide the case "A" with a suitable latch E provided with a sliding bolt "$e$." To receive the bolt the rim B of the light, as shown in Fig. 5, is constructed with a series of perforations $b^2$ preferably located in a circle about the corresponding pivot "$a$." The bolt "$e$" of the latch may engage in any one of the perforations $b^2$ to effectually hold the light in any required position so as to create a direct current of fresh air into the cabin or to force outward the impure air, as may be required. Any desired amount of opening can thus be given. It is evident that the light can thus be opened or closed and made water-tight readily and easily. To close the scuttle or light in case of the breakage of the light, or whenever desired in stormy weather, or when the light is located in a position which may require it to be protected and closed when desired, I provide a "dead-door" F, shown in Fig. 4. This "dead-door," I prefer to construct with an inwardly projecting flange "$f$"

having a screw threaded engagement upon the exterior of the compression ring D, as shown. A packing ring G may be located upon the outer edge of the compression ring, as shown, between said compression ring and the "dead-door," whereby the engagement of the "dead door" upon the compression ring will be made water-tight. The "dead door" may be provided with operating handles $f'$. This "dead-door" may readily be applied or removed as circumstances make it necessary. The "dead-door" may be united by a swivel-joint, as at $f^2$, to a chain H whereby the "dead-door" may be supported, when not in use, adjacent to the side light, and in position to be readily and quickly applied. It will be evident that this method of compressing the packing ring acts with perfect uniformity throughout securing a better and closer water-tight joint than has heretofore been adopted in devices of this class, inasmuch as the compression ring exerts its force upon the packing ring at all points in the same degree. So also, a piece of rubber tubing for a packing ring in connection with the compression ring will secure better results than a solid ring of any material, for the reason that it accommodates itself to the adjacent surfaces much better than a solid substance would do.

What I claim as my invention is—

1. In a side light the frame A, the tubular packing ring fitting a groove formed therein, said frame having external screw threads, a ring C bearing against the tubular packing ring and a ring D with interior threads engaging the threads on the frame, substantially as described.

2. In a side light, the frame having a horizontal flange externally threaded, a ring D having two horizontal flanges, one internally screw threaded and engaging the thread on the frame, the other flange externally threaded and a dead door F having a horizontal flange with internal threads to engage said external threads, and suitable packing interposed between the ring D and frame A, and dead door F and ring D, substantially as described.

In testimony whereof I sign this specification in the presence of two witnesses.

CHARLES ANDERSON.

Witnesses:
 N. S. WRIGHT,
 H. R. WHEELER.